United States Patent
Namburu et al.

(10) Patent No.: US 9,313,871 B2
(45) Date of Patent: Apr. 12, 2016

(54) APPARATUS AND METHOD OF ALIGNING AND SECURING COMPONENTS OF A LIQUID COOLED PLASMA ARC TORCH AND IMPROVED TORCH DESIGN

(71) Applicant: LINCOLN GLOBAL, INC., City of Industry, CA (US)

(72) Inventors: Praveen K Namburu, Mount Pleasant, SC (US); Jackie L Winn, Mount Pleasant, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 14/631,814

(22) Filed: Feb. 25, 2015

(65) Prior Publication Data
US 2015/0173165 A1    Jun. 18, 2015

Related U.S. Application Data

(63) Continuation-in-part of application No. 13/956,179, filed on Jul. 31, 2013.

(60) Provisional application No. 61/949,573, filed on Mar. 7, 2014.

(51) Int. Cl.
*B23K 10/00* (2006.01)
*H05H 1/28* (2006.01)
(Continued)

(52) U.S. Cl.
CPC .................. *H05H 1/28* (2013.01); *B23K 9/285* (2013.01); *B23K 10/00* (2013.01); *H05H 1/34* (2013.01); *H05H 2001/3426* (2013.01); *H05H 2001/3436* (2013.01); *H05H 2001/3478* (2013.01)

(58) Field of Classification Search
CPC ............ H05H 1/28; H05H 1/34; H05H 1/26; H05H 2001/3436; H05H 2001/3426; H05H 2001/3478; B23K 10/00; B23K 9/285

USPC ......... 219/121.5, 121.51, 121.48, 121.52, 75, 219/121.49
See application file for complete search history.

(56) References Cited

U.S. PATENT DOCUMENTS

| 4,967,055 A | 10/1990 | Raney et al. |
| 5,105,061 A | 4/1992 | Blankenship et al. |

(Continued)

FOREIGN PATENT DOCUMENTS

| EP | 0249238 A2 | 12/1987 |
| EP | 0941018 A2 | 9/1999 |

OTHER PUBLICATIONS

International Application No. PCT/IB2014/001353, International Search Report & Written Opinion, 12 pages, Nov. 25, 2014.
(Continued)

*Primary Examiner* — Mark Paschall
(74) *Attorney, Agent, or Firm* — Perkins Coie LLP

(57) ABSTRACT

A plasma arc torch includes a cathode adaptor body having at least two sealant channels with sealant rings. The torch also includes a cathode body having at least two sealant channels with sealant rings. The torch further includes a pilot arc connector having at least two sealant channels with sealant rings. The torch additionally includes a rear isolator that includes at least two sealant channels with sealant rings that engage an anode body and are spaced apart from each other by a distance that is in a range of 2 percent to 50 percent of an overall length of the rear isolator. The rear isolator also includes at least two sealant channels with sealant rings that engage a ring isolator and are spaced apart from each other by a distance that is in a range of 2 percent to 50 percent of the overall length of the rear isolator.

21 Claims, 7 Drawing Sheets

(51) Int. Cl.
*B23K 9/28* (2006.01)
*H05H 1/34* (2006.01)

(56) References Cited

U.S. PATENT DOCUMENTS

| | | |
|---|---|---|
| 5,278,388 A | 1/1994 | Huang |
| 5,414,237 A | 5/1995 | Carkhuff |
| 5,440,094 A | 8/1995 | Zapletal et al. |
| 5,464,962 A | 11/1995 | Luo et al. |
| 5,601,734 A | 2/1997 | Luo et al. |
| 5,695,662 A | 12/1997 | Couch, Jr. et al. |
| 5,756,959 A | 5/1998 | Freeman et al. |
| 5,767,478 A | 6/1998 | Walters |
| 5,841,095 A | 11/1998 | Lu et al. |
| 5,886,315 A | 3/1999 | Lu et al. |
| 5,961,264 A | 10/1999 | Postadan |
| 5,977,510 A | 11/1999 | Lindsay et al. |
| 5,994,663 A | 11/1999 | Lu |
| 6,020,572 A | 2/2000 | Marner et al. |
| 6,066,827 A | 5/2000 | Nemchinsky |
| 6,084,199 A | 7/2000 | Lindsay et al. |
| 6,114,650 A | 9/2000 | Marner et al. |
| 6,130,399 A | 10/2000 | Lu et al. |
| 6,207,923 B1 | 3/2001 | Lindsay et al. |
| 6,403,915 B1 | 6/2002 | Cook et al. |
| 6,423,922 B1 | 7/2002 | Nemchinsky et al. |
| 6,424,082 B1 | 7/2002 | Hackett et al. |
| 6,452,130 B1 | 9/2002 | Qian et al. |
| 6,464,034 B1 | 10/2002 | Tateishi et al. |
| 6,483,070 B1 | 11/2002 | Diehl et al. |
| 6,614,001 B2 | 9/2003 | Hackett et al. |
| 6,686,559 B1 | 2/2004 | Walters et al. |
| 6,841,754 B2 | 1/2005 | Cook et al. |
| 6,946,617 B2 | 9/2005 | Brandt et al. |
| 6,969,819 B1 | 11/2005 | Griffin et al. |
| 7,019,255 B2 | 3/2006 | Brandt et al. |
| 7,081,597 B2 | 7/2006 | Severance, Jr. et al. |
| 7,193,174 B2 | 3/2007 | Brandt et al. |
| 7,256,366 B2 | 8/2007 | Severance et al. |
| 7,375,302 B2 | 5/2008 | Twarog et al. |
| 7,375,303 B2 | 5/2008 | Twarog et al. |
| 7,423,235 B2 | 9/2008 | Severance, Jr. et al. |
| 7,435,925 B2 | 10/2008 | Griffin et al. |
| 7,598,473 B2 | 10/2009 | Cook et al. |
| 7,605,340 B2 | 10/2009 | Duan et al. |
| 7,659,488 B2 | 2/2010 | Cook et al. |
| 7,754,993 B2 | 7/2010 | Ortega et al. |
| 7,829,816 B2 | 11/2010 | Duan et al. |
| 7,989,727 B2 | 8/2011 | Twarog et al. |
| 8,035,055 B2 | 10/2011 | Twarog et al. |
| 8,089,025 B2 | 1/2012 | Sanders et al. |
| 8,097,828 B2 | 1/2012 | Roberts et al. |
| 8,101,882 B2 | 1/2012 | Mather et al. |
| D654,104 S | 2/2012 | Fitzpatrick et al. |
| 8,115,136 B2 | 2/2012 | Mather et al. |
| 8,153,927 B2 | 4/2012 | Twarog et al. |
| 8,212,173 B2 | 7/2012 | Liebold et al. |
| 8,304,684 B2 | 11/2012 | Smith et al. |
| 8,338,740 B2 | 12/2012 | Liebold et al. |
| 8,389,887 B2 | 3/2013 | Currier et al. |
| 8,395,077 B2 | 3/2013 | Duan et al. |
| 8,525,069 B1 | 9/2013 | Mather et al. |
| 8,541,712 B2 | 9/2013 | Mather et al. |
| D692,402 S | 10/2013 | Dalton et al. |
| 8,546,718 B2 | 10/2013 | Mather et al. |
| 8,546,719 B2 | 10/2013 | Warren, Jr. et al. |
| 8,581,139 B2 | 11/2013 | Severance, Jr. |
| 8,633,417 B2 | 1/2014 | Ashtekar et al. |
| 8,698,036 B1 | 4/2014 | Kornprobst et al. |
| 8,759,709 B2 | 6/2014 | Mather et al. |
| 8,772,667 B2 | 7/2014 | Yang et al. |
| 8,829,385 B2 | 9/2014 | Yang et al. |
| 2003/0100208 A1* | 5/2003 | Conway ............... B23K 9/323 439/191 |
| 2003/0116522 A1 | 6/2003 | Julian et al. |
| 2004/0200810 A1* | 10/2004 | Brandt ............... H05H 1/28 219/121.49 |
| 2010/0155373 A1 | 6/2010 | Yamaguchi et al. |
| 2012/0031881 A1 | 2/2012 | Griffin et al. |
| 2012/0138584 A1* | 6/2012 | Ashtekar ............... H05H 1/28 219/121.52 |
| 2013/0306607 A1 | 11/2013 | Mather et al. |
| 2014/0021175 A1 | 1/2014 | Chen et al. |
| 2014/0110382 A1 | 4/2014 | Beliveau et al. |

OTHER PUBLICATIONS

International Application No. PCT/IB2014/001354, International Search Report & Written Opinion, 11 pages, Nov. 19, 2014.
International Application No. PCT/IB2015/000297, International Search Report & Written Opinion, 11 pages, Jun. 8, 2015.

* cited by examiner

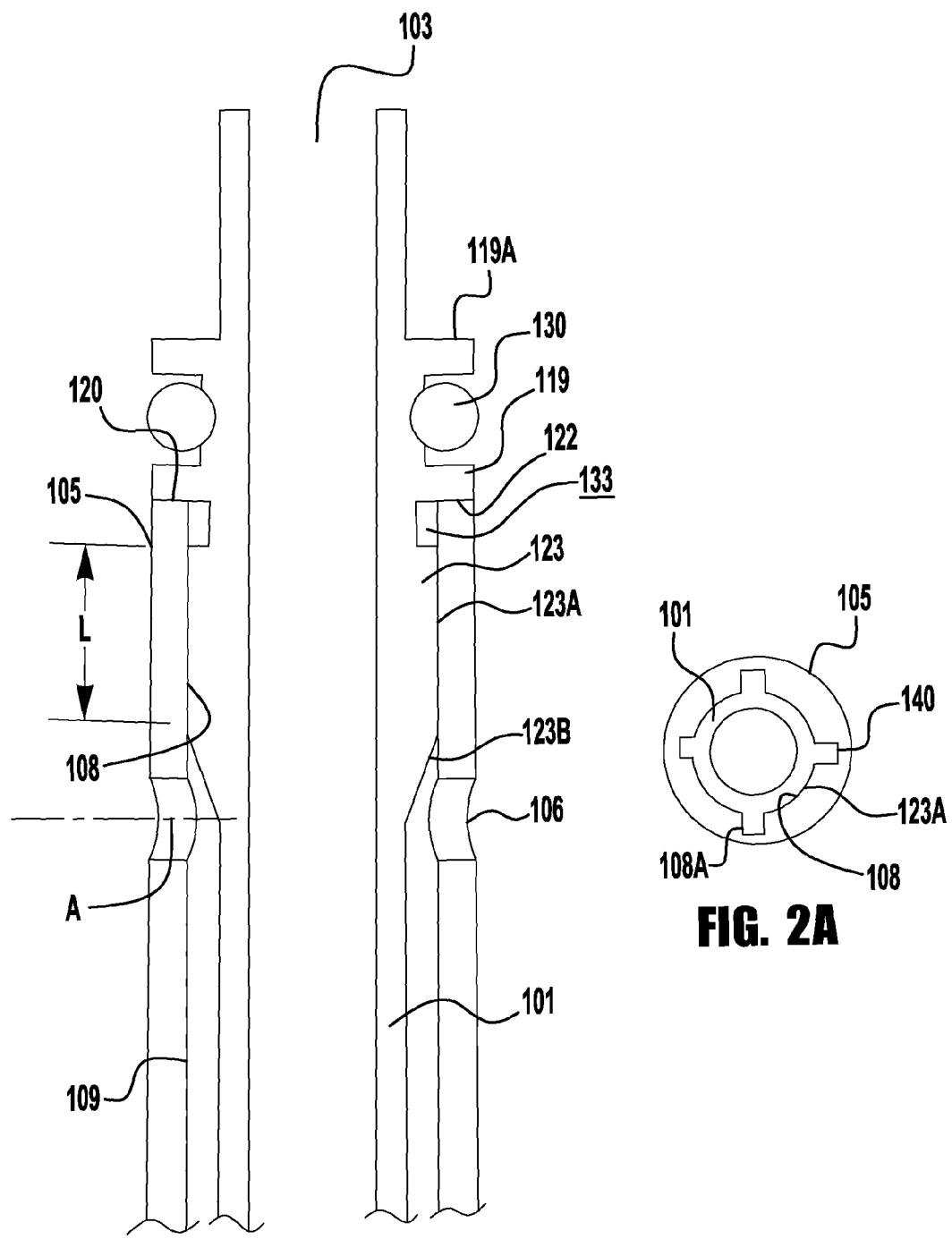

APPARATUS AND METHOD OF ALIGNING AND SECURING COMPONENTS OF A LIQUID COOLED PLASMA ARC TORCH AND IMPROVED TORCH DESIGN

PRIORITY

The present application claims priority to Provisional Application 61/949,573, filed Mar. 7, 2014, which is incorporated herein by reference in its entirety, and the present application is a continuation-in-part of and claims priority to U.S. patent application Ser. No. 13/956,179 filed on Jul. 31, 2013, the entire disclosure of which is incorporated herein by reference in its entirety.

TECHNICAL FIELD

Devices, systems, and methods consistent with the invention relate to cutting, and more specifically to devices, systems and methods for aligning and securing components of a liquid cooled plasma arc torch and an improved torch design.

BACKGROUND

In many cutting operations, plasma arc torches are utilized. These torches operate at very high temperatures which can damage many components of the torches. As such, some torches use liquid cooling to transfer the heat away from some of the cutting torch components. The cooling liquid is passed through various fluid chambers, etc. However, the presence and need for these chambers and passages means that alignment of some of the components of the torch assembly can be difficult, especially when components are replaced. When installation alignment is poor the performance of the cooling can be adversely affected and thus the usable life of the torch and torch components can be greatly diminished. Some torches have added various stabilizing portions on some of the components that extend into the cooling fluid paths, however these stabilizing portions can interfere with fluid flow and thus compromise the cooling abilities of the torch assembly. Further, existing torches have configurations which do not adequately address coolant leaks or spills to prevent the coolant from contacting critical components or leaking out of the torch.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is an arc torch assembly or sub assembly having improved replacement and centering characteristics, where certain components of the torch head have particular characteristics which improve the operation, use and replaceability of the various components. Further embodiments of the present invention also have enhanced leakage prevention structure and components to prevent coolant from leaking from the torch.

In another exemplary embodiment, a plasma arc torch comprises a cathode adaptor body having at least two first sealant channels formed on an outer surface of a first end of the cathode adaptor body to respectively accept at least two first sealant rings. The at least two first sealant channels are spaced apart from each other by a first distance that is in a range of 2 percent to 90 percent of an overall length of the cathode adaptor body. The torch also includes a cathode body coupled to a second end of the cathode adaptor body with the cathode body having at least two second sealant channels formed on an outer surface of the cathode body to respectively accept at least two second sealant rings. The at least two second sealant channels are spaced apart from each other by a second distance that is in a range of 2 percent to 50 percent of an overall length of the cathode body. The torch further includes a pilot arc connector having at least two third sealant channels formed on an outer surface of the pilot arc connector to respectively accept at least two third sealant rings. The at least two third sealant channels are spaced apart from each other by a third distance that is in a range of 2 percent to 90 percent of an overall length of the pilot arc connector. The torch additionally includes a rear isolator that isolates the cathode body from an anode body. The rear isolator includes at least two fourth sealant channels formed on an outer surface of the rear isolator to respectively accept at least two fourth sealant rings. The at least two fourth sealant rings engage with an inner surface of the anode body and the at least two fourth sealant channels are spaced apart from each other by a fourth distance that is in a range of 2 percent to 50 percent of an overall length of the rear isolator. The rear isolator also includes at least two fifth sealant channels formed on the outer surface of the rear isolator to respectively accept at least two fifth sealant rings. The at least two fifth sealant rings engage with an inner surface of a ring isolator and the at least two fifth sealant channels are spaced apart from each other by a fifth distance that is in a range of 2 percent to 50 percent of the overall length of the rear isolator.

BRIEF DESCRIPTION OF THE DRAWINGS

The above and/or other aspects of the invention will be more apparent by describing in detail exemplary embodiments of the invention with reference to the accompanying drawings, in which:

FIG. 2 illustrates an another view of the cutting torch coolant tube of FIG. 1;

FIGS. 2A and 2B illustrate a similar view of that shown in FIG. 2, but of a different exemplary embodiment;

DETAILED DESCRIPTION

Figure 1:
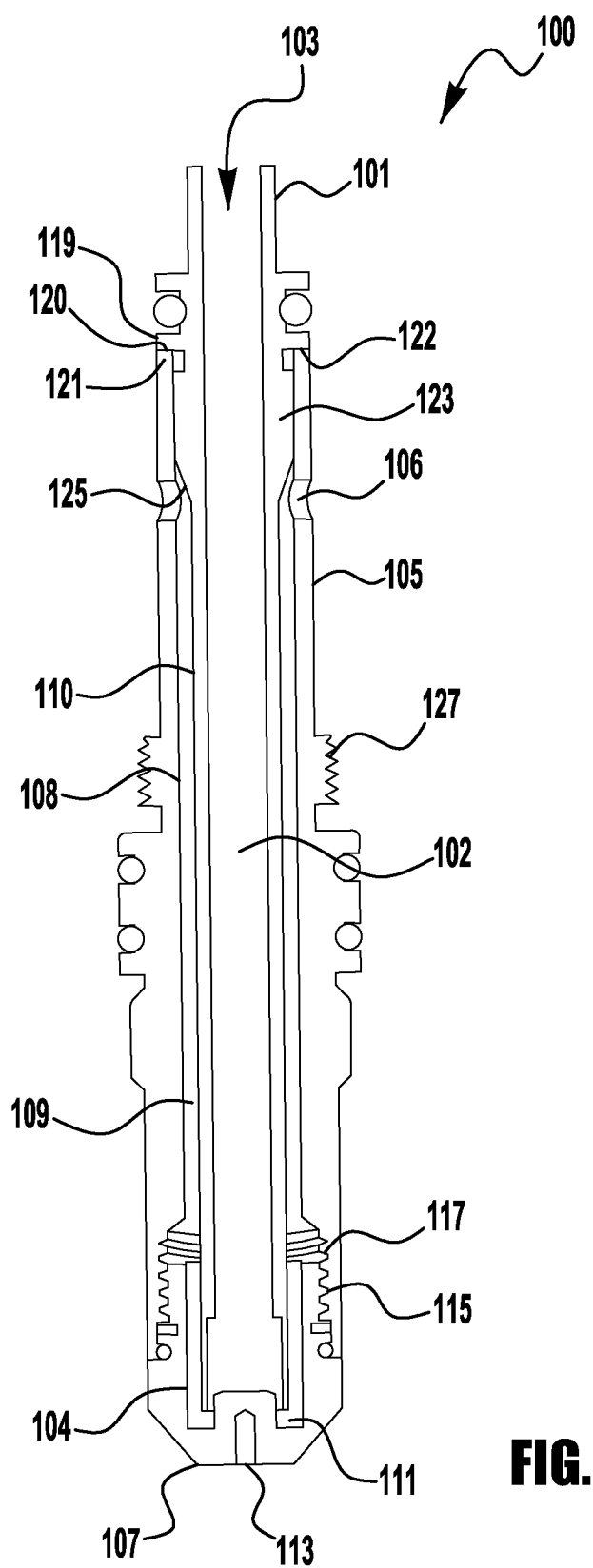
FIG. 1 illustrates an exemplary embodiment of a cutting torch coolant tube assembly of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts a diagrammatical representation of an exemplary embodiment of a cutting torch cooling tube electrode assembly 100 of the present invention. As is generally understood, the assembly 100 is inserted into a torch body which is not shown here for clarity (see FIG. 4). The assembly 100 comprises a coolant tube 101 which is inserted into a channel 109 of a coolant tube holder 105 and a channel 104 of an electrode 107. The distal end of the coolant tube holder 105 has an opening into which the electrode 107 is inserted. The proximate end of the holder 105 also has an opening into which the coolant tube 101 is inserted, as shown.

The coolant tube 101 has a proximate end opening 103 which feeds into a channel 102 in the coolant tube. During operation, the cooling liquid is directed to the opening 103 and down through the channel 102 towards the distal end of the coolant tube 101. The tube 101 has a length such that its distal end creates a gap 111 between the end of the tube 101 and an inner wall of the channel 104 of the electrode 107. This gap 111 is important to the operation of the assembly 100 as the coolant flows down the channel 102 it passes through this gap 111 and enters the channel 104 of the electrode 107 and then the channel of the holder 105 to provide the desired cooling. Maintaining a consistent width of the gap 111 is important to proper coolant flow and in many known torch assemblies this is difficult to do, particularly when the electrode and/or coolant tube of prior torches is replaced. Because of the structure of known torches it is difficult to assemble the components to achieve the desired gap 111 dimension when replacing any of the components. This results in diminished cooling performance. Embodiments of the present provide for very consistent insertion of the tube 101 and the gap 111 dimension, as well as centering of the tube 101 in the channels 109 and 104, which will be described in more detail below.

Once the coolant passes through the gap 111 it is directed through the channel 109 towards the proximate end of the holder 105 between the outer surface 110 of the tube 101 and the inner surface 108 of the holder 105. In embodiments of the present invention, the holder 105 contains a plurality of exit ports 106 which allows the coolant to exit the channel 109 and transfer heat away from assembly 100. The ports 106 are positioned radially around a centerline of the holder 105 so that the coolant exits radially away from the holder 105 centerline as opposed to out of its proximate end. In exemplary embodiments, the holder 105 contains between 3 and 8 ports. The radial displacement of the ports is symmetrical to ensure even flow. The diameter of the ports is to be selected to ensure that the desired coolant flow is achieved during operation. In some exemplary embodiments all of the ports 106 have the same diameter. However, in other exemplary embodiments, the ports 106 can have different diameters. For example, half of the ports 106 can have a first diameter, while the other half of the ports 106 can have a second diameter which is less than the first diameter. Once the coolant exits the ports 106 it is recycled through a heat exchange and/or cooling system as is generally known and understood. Further, in some exemplary embodiments the ports have a circular opening, while in other exemplary embodiments, at least some of the ports 106 can have non-circular shapes like slots, etc. After cooling the electrode the coolant recirculates through the ports to a heat exchanger (not shown for clarity).

FIG. 2 shows a close up view of the proximate end of the coolant tube holder 105 and the coolant tube 101, which shows how the coolant tube 101 is stabilized and centered in the coolant tube holder 105. As shown, the coolant tube 101 has a stabilization portion 123 which extends radially around the tube 101. The stabilization portion 123 has an outer land surface 123A which engages with the inner surface 108 of the holder 105. When the tube 101 and the holder 105 are engaged with each other there is a friction fit engagement between the portion 123 and the surface 108. The friction fit engagement between the portion 123 and the surface 108 holds the tube 101 centered in the channel 109 and ensures that each time the cooling tube, and other components are replaced the components are repositioned in a centered state with little difficulty. In exemplary embodiments, the portion 123 is configured such that the friction fit engagement with the holder 105 is continuous radially around the surface 108. Stated differently, the engagement between the portion 123 and surface 108 is such that not fluid (cooling fluid, etc.) can pass between the portion 123 and the surface 108. Thus, it is easier to replace the components, including the assembly 100 in a torch and providing more consistent accurate replacement.

Figure 2B:
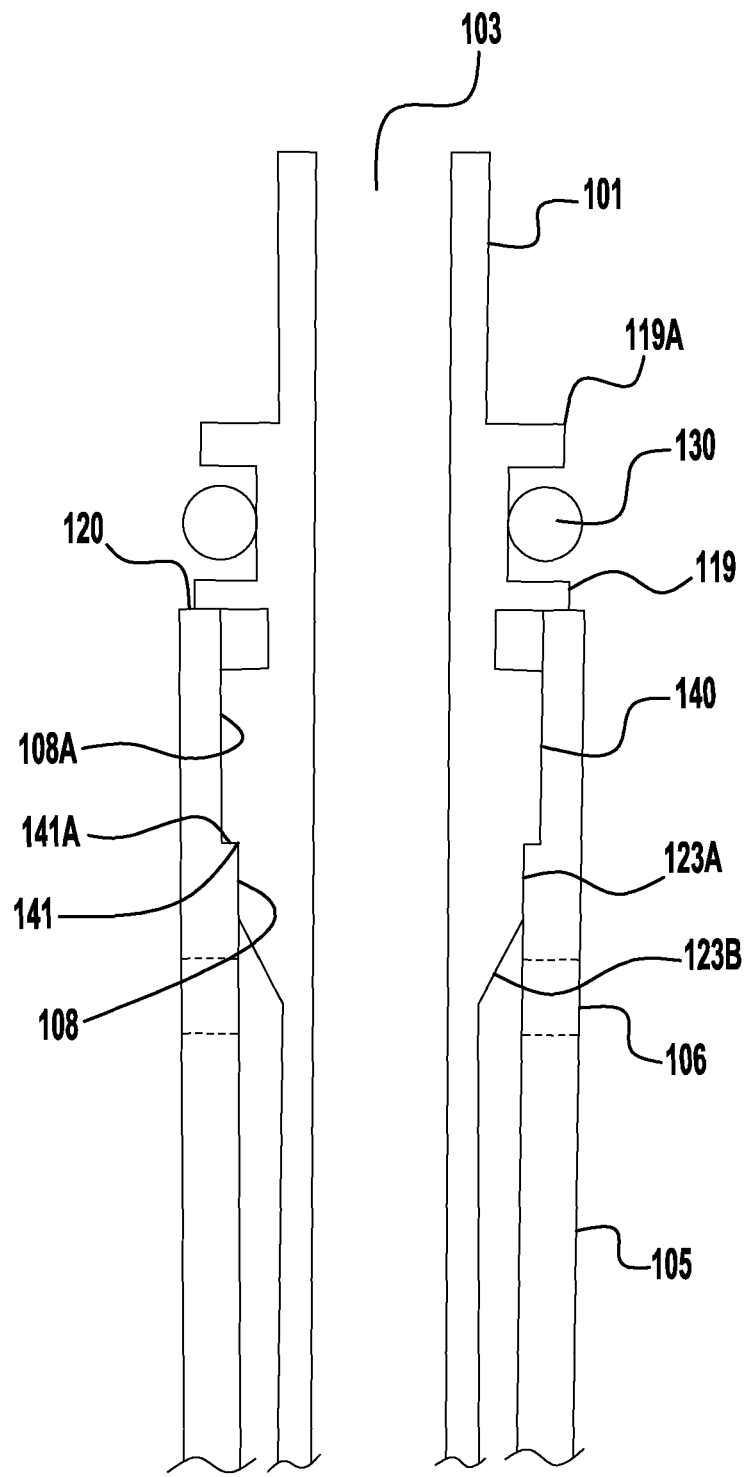

Another exemplary embodiment of the present invention, is shown in FIGS. 2A and 2B, where the coolant tube 101 has extension portions 140 which extend radially outward from the portion 123 as shown. These extension portions 140 extend out from portion 123 into grooves 108A in the coolant tube holder 105 and aide to ensure proper insertion into the coolant tube holder 105. In exemplary embodiments the extension portions 140 have a friction fit with the grooves 108A. This engagement aids in centering the coolant tube 101 as well as ensuring that the coolant tube 101 is oriented radially in the proper position. In exemplary embodiments, the extension portions 140 have a length which is less than the length L of the portion 123. Further, the extension portions have a surface 141 which engages with an adjacent surface 141A on the coolant tube holder 105. The engagement of these two surfaces acts to again ensure proper placement of the coolant tube 101 in the coolant tube holder 105 and ensure that it is not inserted too far into the holder 105. Although four portions 140 are shown in FIGS. 2A and 2B, other embodiments can use a different number of portions 140.

In lieu of various aspects of the above described invention, the coolant tube 101 will always be inserted in a concentric state in its holder 105. Thus preventing improper insertion and decreased component life.

Additionally, as shown the tube 101 has securing portion 119, which is closer to the proximal end of the tube than the stabilization portion 123, which is used in conjunction with a third portion 119A to hold an o-ring 130 in place. The o-ring 130 is used to provide a seal for the assembly 100 and tube 101 when installed in a torch assembly. Each of the securing portion 119 and the third portion 119A extended radially around the tube 101. The securing portion 119 has a distal surface 122 which, when installed in the holder 105, engages with a the proximal end surface 120 of the holder 105. Because of this engagement, the insertion of the tube 101 into the holder 105 will always be made at the appropriate position to ensure that the gap 111 is the proper distance. In known torch assemblies the depth of insertion is difficult to repeat or perform consistently. Thus, the surfaces 122 and 120 ensure that the tube 101 is inserted to the proper distance easily and nearly eliminates error during replacement and assembly. Further, the combination of having the surface 122 engage with the surface 120 at the proximal end of holder 105 and the portion 123 engaging with the surface 108 provides a coolant tube assembly 100 with improved centricity and improved reliability during assembly and replacement of components over known torches. The combination of these engagements in close proximity to each other ensures that the tube 101 is inserted into the holder 105 at the proper depth for the gap 111 and centered within the channel 109. Further, this configuration allows the tube 101 to be configured without positional protrusions closer to the distal end of the tube 101. In some known torch assemblies the coolant tube has protrusions positioned closer to the distal end of the tube to aid in centering the tube. However, these protrusions extend into the coolant flow path and thus impede coolant flow and coolant performance. Some exemplary embodiments of the present invention can use positional protrusions, but because of the advantages of the above discussed configuration the protrusions can be smaller, and in many applications are not necessary.

Also as shown in FIG. 2, exemplary embodiments of the present invention include an undercut portion 133 positioned between portions 119 and 123. This undercut portion serves to ensure proper seating between surfaces 122 and 120 and thus the coolant tube 101 in the coolant tube holder 105. This undercut portion 133 is to have a length along the coolant tube which is less than the length L of the portion 123.

As described above, the stabilization portion 123 aids in stabilizing the tube 101 when inserted into the holder 105 in a press fit state. Thus, the length of the portion 123 needs to be sufficient to provide the desired stabilization and ensure centricity when inserted. To achieve this, in exemplary embodiments of the present invention, the outermost plateau surface 123A of the portion 123 has a length L that is in the range of 10 to 20% of the length of the tube 101 which is inserted into the holder 105 (the length of the tube from its distal end at the gap 111). Having a plateau length in this range ensures sufficient alignment and stability while also allowing for accurate and repeatable positioning. In other exemplary embodiments the length of the plateau portion 123A is in the range of 4 to 25% of the length of the tube 101 within the holder 105. The plateau length L described above is the length of the flat surface on the portion 123 that makes contact with the inner surface of the holder 105 when the tube is inserted into the holder 105.

As also shown in FIG. 2, the portion 123 has an angled surface 123B which extends from the body of the tube 101 to the plateau surface 123A. The angled surface 123B aids in guiding the flow of the coolant fluid out of the ports 106. This aids in preventing the creation of stagnation zones in the fluid flow and increases the performance of the fluid flow. In some exemplary embodiments, the angle A between the body of the tube 101 and the surface 123B is in the range of 16 to 60 degrees. In other exemplary embodiments the angle is in the range of 40 to 60 degrees. Further, as shown in FIG. 2, the center of the angle A is positioned such that it aligns with the centerline of the ports 106. If the angle A is a radiused angle A, as in some exemplary embodiments, then the center A corresponds to the center of a circle defined by the radius of the angle A, whereas if the angle A is a sharp angle then the center of the angle A is the inflection point. In some exemplary embodiments, the center of the angle A is aligned with the centerline of the ports 106. In other exemplary embodiments, the centerline of the angle A is positioned such that it is close to the centerline of the ports 106, but does not have to be aligned with the centerline. In such embodiments, the center of the angle A is positioned within 10% of the diameter of the ports 106 with respect to the centerline of the ports 106. For example, if the diameter of the ports 106 is 0.25", the center of the angle A is aligned within +/−0.025" of the centerline of the ports. If the ports have varying diameters (as referenced previously) the average of the port diameters is to be used to determine the range of alignment as described above.

As shown in FIG. 1, the electrode 107 is shorter and threaded into the coolant tube assembly. Such a configuration allows the electrode 107 to be considerably smaller and much easier to be replaced. Because of this configuration, in exemplary embodiments of the present invention, the electrode 107 can have a length (form its most distal to most proximate ends) that is within the range of 4 to 20% of the coolant tube assembly 100, 5 to 20% of the length of the coolant tube 101, and within the range of 5 to 20% the length of the coolant tube holder 105. With these ratios, embodiments of the present invention provide excellent cutting performance and at the same time allow for ease of replacement and alignment of each of the respective components, as described herein. That is, when a component such as the electrode 107 need be replaced, the fit and construction of the assembly of the holder 105 and tube 101 (which can be replaced as a single unit) ensures proper replacement. Further, it is not necessary to remove the coolant tube holder and thus risk misaligning the coolant tube holder or the remainder of the assembly 100 when replacement of the electrode 105 is needed. Additionally, the coolant tube holder 105 and the coolant tube 101 can be kept as an assembly to be replaced as needed which ensures that the assembly remains aligned if removed or replaced.

The electrode 107 can be made of known materials used for electrodes, including but not limited to copper, silver, etc. Further, because of the reduced size of the electrode 107 there is a significant reduction in cost by just replacing the electrode 107 of the present invention.

Figure 3:
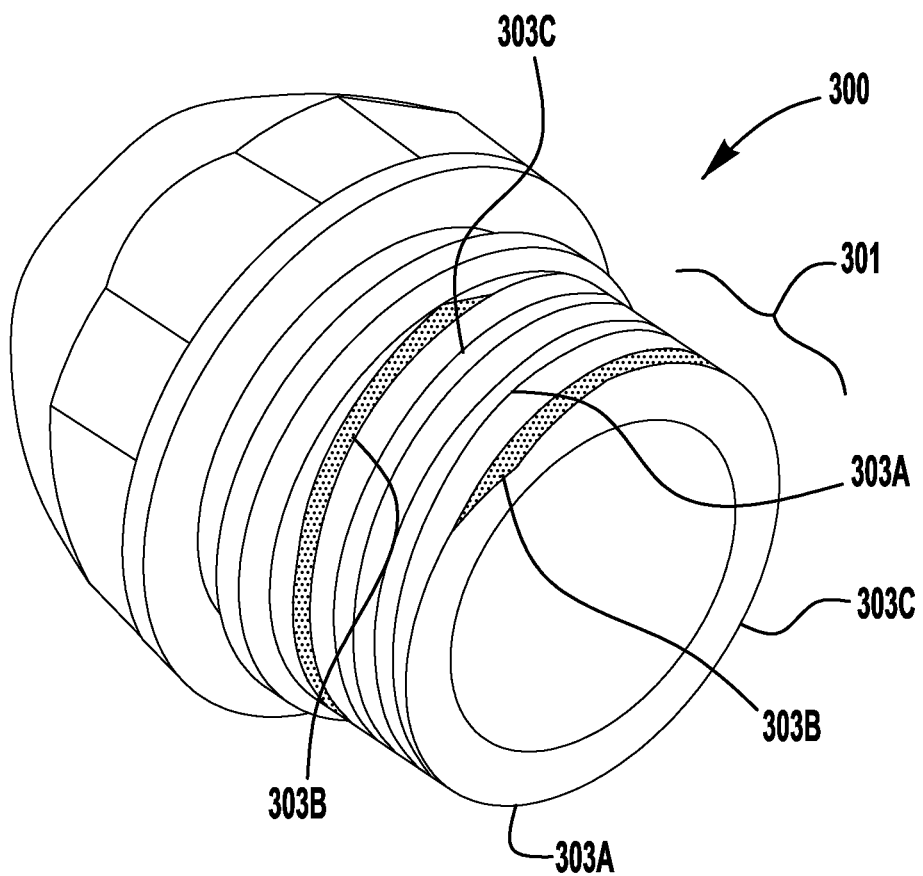
FIG. 3 illustrates an exemplary embodiment of an thread pattern that can be used with various components of the present invention.

FIG. 3 depicts another aspect of the present invention, which aids in ensuring proper alignment and centricity during assembly and replacement of components of the assembly 100. Specifically, FIG. 3 depicts a quick-coupling, multi-start thread configuration which is used on various components of the torch assembly 100, and can be used on other components of a torch. As described more fully below, the thread design employs multiple starts and a modified thread pitch to enhance alignment and installation, during assembly and replacement.

As described previously, it is often necessary to remove and replace worn components of a cutting torch. Because of the need to replace components often it is desirable to speed up the process while at the same time ensuring that the replaced components are properly installed and aligned. Known torch assemblies use a standard single thread design, and some have used a bayonet thread design. However, these thread designs often require an appreciable number of turns to complete the installation, and increase the likelihood of an error during threading, such as cross-threading. For example, in most applications replacement of threaded components can require anywhere from 5 to 10 full turns of the item. By having such large number of turns for a component there is an increased likelihood of cross-threading the component, and/or result in the component not being completely tightened which can result in leaks and/or poor component life. Embodiments of the present invention address these issues by using a multi-thread design which utilizes existing required installation torque and thread stresses while maintaining the same applied force to mating parts as known thread systems.

FIG. 3 depicts an exemplary embodiment of an electrode 300 having a multi-thread design of the present invention. Specifically, the electrode 300 has a thread portion 301 having a plurality of separate and distinct thread paths 303A, 303B and 303C. The embodiment shown has three distinct thread paths 303, but other embodiments of the present invention can use more than three thread paths. For example, other exemplary embodiments can use 4 distinct thread paths, and others can use as many as 5 different thread paths. By using multiple thread paths, embodiments of the present invention can provide easy and accurate replacement of components, greatly minimizing misalignment and/or cross-threading of components, while at the same time providing the required and desired applied connection force. Embodiments of the present invention, also deliver the desired mating force by using significantly less complete rotations of the component, thus making the replacement of a component quicker and more consistent. For example, embodiments of the present invention can provide the complete installation of a component with only 1 to 2 complete rotations of a component. In some exemplary embodiments, complete installation of a component can be achieved by 1.25 to 1.5 complete rotations of the component. For example, in certain applications electrodes of the present invention can be installed with only 1.25 to 1.5 complete rotations. By using such a low number of rotations to complete an installation, the chances of accurate and complete installation are greatly increased.

Figure 4:
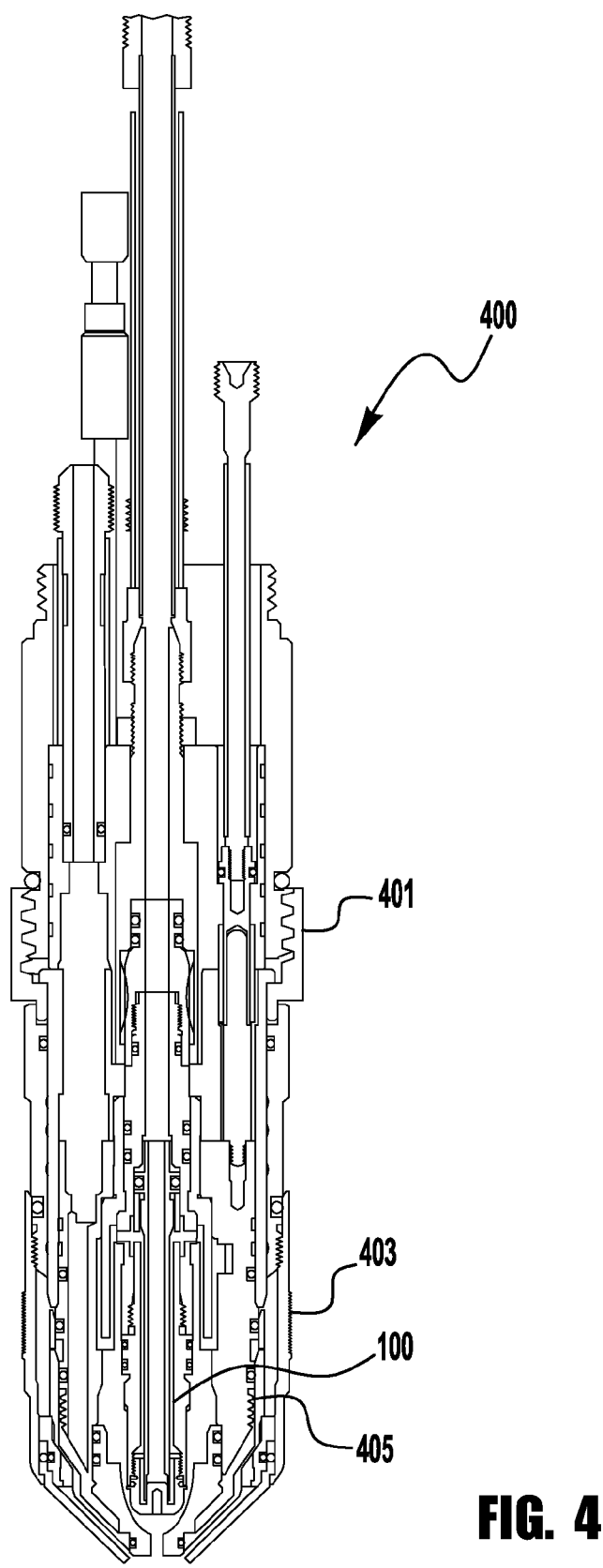
FIG. 4 illustrates an exemplary embodiment of a torch assembly utilizing the assembly of FIG. 1.

Thus, embodiments of the present invention can provide highly accurate installation by ensuring proper alignment, minimizing the chances of cross threading or misalignment and ensuring that the component (for example the electrode 107) is fully installed. By reducing the number of rotations required to install a component, embodiments of the present invention make it much easier on an installer to ensure that complete installation has been achieved. Because of the advantages of the present invention, the multi-thread configuration can be used on all components of a torch head assembly that utilize threads, and in particular those threads on components that are frequently replaced. For example, each of the threads 115, 117 and 127 shown in FIG. 1 can have the multi-thread configuration as described above. Further, in addition to these components, embodiments can also use this thread configuration on other torch assembly components, such as quick disconnect rings, inner and outer retaining caps, electrodes, coolant tubes, holders, etc. As shown in FIG. 4, the torch attachment ring 401 connects the torch head to the torch base, the outer retaining cap 403 aids in retaining the torch shield cap and the inner retaining cap 405 aids in retaining the torch nozzle.

FIG. 4 depicts an exemplary embodiment of a torch assembly 400 that contains the assembly 100 from FIG. 1. Because the other components of the torch assembly 400 are generally known, they are not discussed in detail herein. Of course, various embodiments of the present invention are not limited to the configuration of the torch assembly 400 as shown in FIG. 4, or the assembly 100 as shown in FIGS. 1 and 2, and these embodiments are intended to be exemplary.

Figure 5:
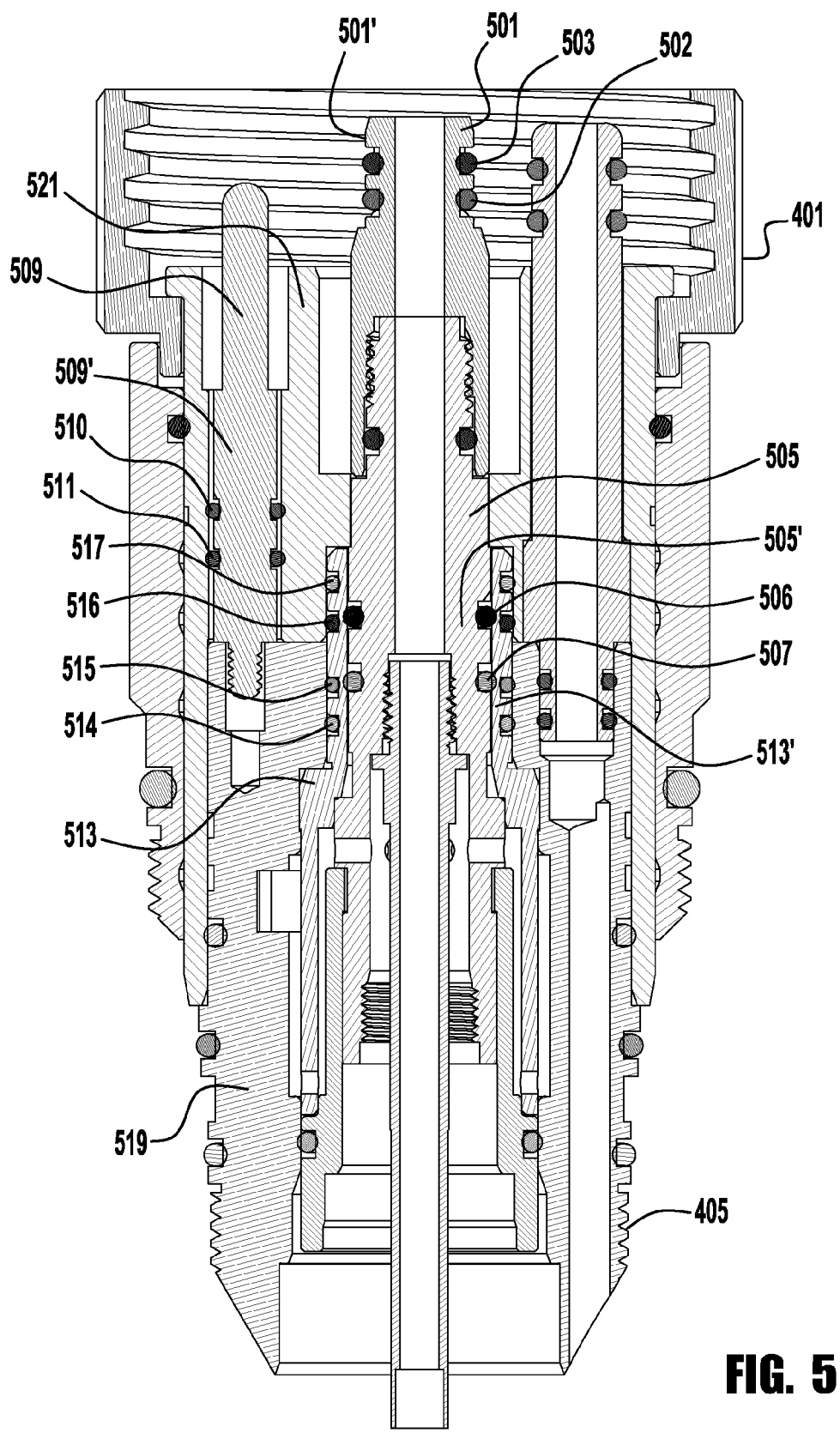
FIGS. 5 and 6 illustrate a further exemplary embodiment of a portion of a torch assembly.

FIG. 5 depicts a close-up of a portion of the torch assembly 400 shown in FIG. 4. As shown, the torch 400 has a cathode adaptor body 501, a cathode body 505, a pilot arc connector 509 and a rear isolator 513, among other components. Because these components, as well as the other torch components, are generally known to those of skill in the art they will not be discussed in detail herein. In general, except to the extent discussed below, the structure of the torch components can be consistent with known torch configurations as aspects of the invention can be used in conjunction with multiple torch configurations. For example, as shown, the cooling tube in FIG. 5 is a different configuration than the cooling tube in FIG. 4. Thus, embodiments of the present invention and structural characteristics as shown in FIG. 5 can be used with the embodiment shown in FIG. 4, and vice versa.

As briefly explained above, during either operation or installation of the torch 400 and its components the liquid coolant can leak around some of the parts which can be detrimental to the life and operation of the torch and its individual components. Additionally, shielding gas can also be caused to leak during operation which could cause a drop in shielding gas pressure—which can be detrimental when cutting. Therefore, embodiments of the present invention utilize various seals and sealing mechanisms to greatly improve the sealing of the torch 400 and its components. This is explained in more detail with respect to FIGS. 5 and 6.

Figure 6:
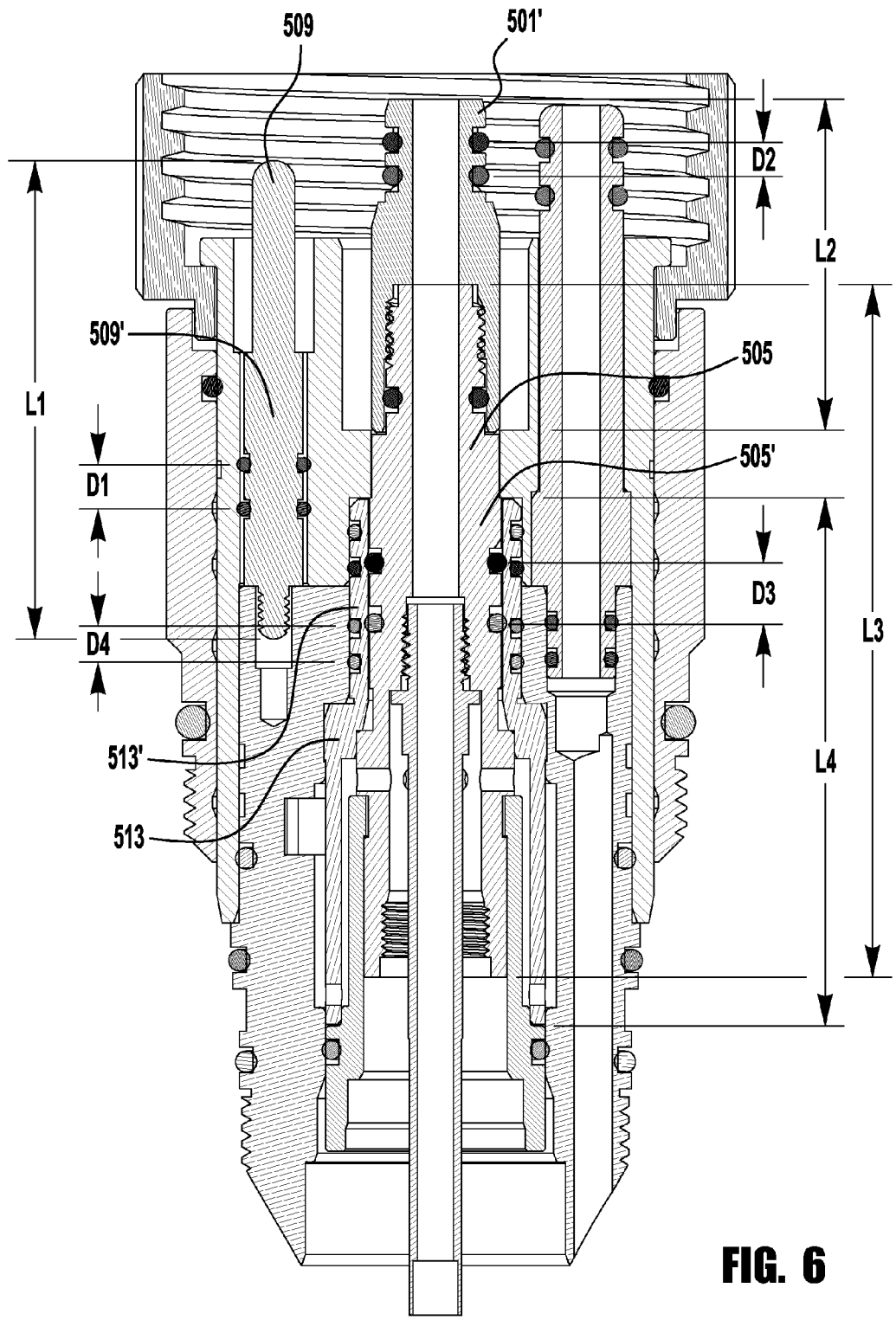

As shown in FIG. 5, the torch 400 includes a cathode adaptor body 501 to which the cathode body 505 is coupled and secured. Because, in some torch constructions, the cathode adaptor body 501 can be exposed to coolant during operation it is desirable to provide adequate sealing of this component. Embodiments of the present invention do this by providing at least two sealant rings 502, 503 (e.g., O-rings) at a connection end 501' of the cathode adaptor body 501. Each of the sealant rings sit in a separate channel formed in the surface of the cathode adaptor body 501 which allow the rings to seat properly. The connection end of the body 501 is the opposite end from the end of the cathode adaptor body 501 to which the cathode body 505 is coupled. Further, as shown in FIG. 6, the at least two O-rings are spaced apart from each other by a distance D2—from centerline to centerline. In exemplary embodiments of the present invention, the distance D2 is in the range of 2 to 90% of the overall length L2 of the cathode adaptor body 501. In other exemplary embodiments, the distance D2 is in the range of 2 to 25% of the overall length L2. Such dimensions provide for optimal positioning of the sealing rings to ensure that a proper seal is maintained during operation and component failure. By maintaining this relationship embodiments of the present invention can provide an enhanced sealing of the cathode adaptor body 501 in a torch assembly 400. Specifically, when the cathode adaptor body 501 is coupled to an appropriate connection (through which a coolant fluid is passed) embodiments of the present invention provide an enhanced sealing and can sufficiently resist the pressures experienced in the coolant fluid flow. In exemplary embodiments of the present invention, the sealant rings 502 and 503 are the same. However, in other exemplary embodiments, the rings 502 and 503 can have different dimensions/characteristics such that they provide different pressure resistance.

Further, as shown in FIGS. 5 and 6, the cathode body 505 has at least two sealant rings 506, 507 (e.g., O-rings) positioned near the center of its overall length L3. Again these sealant rings 506, 507 provide enhanced sealing in the event of a coolant leak or spill and protect components of the torch 400. Each of the sealant rings 506, 507 sit in a separate channel formed in the surface of the cathode body 505 which allow the rings to seat properly. As shown in FIG. 6, the rings 506, 507 are positioned from each other by a distance D3, centerline to centerline. The distance D3 is the in the range of 2 to 50% of the overall length L3 of the cathode body. In other exemplary embodiments, the distance D3 is in the range of 2 to 12% of the overall length of the cathode body. Such dimensions provide for optimal positioning of the sealing rings to ensure that proper seal is maintained during operation and component failure. Furthermore, as shown, the rings 506, 507 are positioned in a central region 505' of the cathode body 505. Further, in exemplary embodiments of the present invention, the rings 506 and 507 are positioned such that the center of the distance D3 is positioned near the center of the overall length L3 of the cathode body. In exemplary embodiments of the present invention, the rings 506 and 507 are positioned such that the center of the distance D3 is positioned such that the center of the distance D3 is no more than 10% of the overall length L3 of the cathode body 505, away from the center of the length of the cathode body 505. For example, if the cathode body 505 is 5" in length, the center of the distance D3 will be positioned no more than 0.5" away from the center of the length L3 of the cathode body 505. This positions the rings 506, 507 at an optimal position within the torch 400. In exemplary embodiments of the present invention, the sealant rings 506 and 507 are the same. However, in other exemplary embodiments, the rings 506 and 507 can have different dimensions/characteristics such that they provide different pressure resistance.

Also, as shown in FIGS. 5 and 6, embodiments of the present invention use at least two sealant rings 510 and 511 on the pilot arc connector 509. The pilot arc connector 509 is used to aid in the creation of a pilot arc during operation of the torch 400. Because its use and operation are generally known, details of a pilot arc connector will not be discussed in detail herein. Each of the sealant rings 510, 511 sit in a separate channel formed in the surface of the pilot arc connector 509 which allow the rings to seat properly. As shown, in exemplary embodiments, the at least two rings 510 and 511 are positioned on a middle region 509' of the pilot arc connector 509 where the middle region 509' has the largest diameter of the pilot arc connector 509. As shown in FIG. 6, the rings 510 and 511 are positioned a distance D1 from each other, where the distance D1 is in the range of 2 to 90% of the overall length L1 of the pilot arc connector 509. In other exemplary embodiments, the distance D1 is in the range of 2 to 50% of the overall length L1. Such dimensions provide for optimal positioning of the sealing rings to ensure that proper seal is maintained during operation and component failure. Further, in exemplary embodiments of the present invention, the rings 510 and 511 are positioned such that the center of the distance D1 is positioned such that the center of the distance D1 is no more than 20% of the overall length L1 of the pilot arc connector 509, away from the center C of the length of the pilot arc connector 509. For example, if the pilot arc connector is 4" in length, the center of the distance D1 will be positioned no more than 0.8" away from the center C of the length L1 of the pilot arc connector 509. This positions the rings 510, 511 at an optimal position within the torch 400. In exemplary embodiments of the present invention, the sealant rings 510 and 511 are the same. However, in other exemplary embodiments, the rings 510 and 511 can have different dimensions/characteristics such that they provide different pressure resistance.

Further, as shown and discussed above, the torch 400 utilizes a rear isolator 513 which isolates the cathode body 505 from the anode body 519. The anode body 519 acts as a housing for the nozzle of the torch and the rear isolator 513 aids in routing fluids (such as the coolant) and houses the cathode body of the torch. As shown, in exemplary embodiments of the present invention, the rear isolator 513 has at least four separate sealant rings 514, 515, 516 and 517 positioned on an outer surface of the rear isolator 513. Each of the sealant rings 514, 515, 516, and 517 sit in a separate channel formed in the surface of the rear isolator 513 which allow the rings to seat properly. As shown, the rings are separated into two groups of rings 514/515 and 516/517, where the first group 514/515 engages with an inner surface of the anode body 519, and the second group 516/517 engages with an inner surface of the thread ring isolator 521. The thread ring isolator 521 aids in isolating the shield cap and outer cap of the torch from the anode body and nozzle. Further, as shown in FIG. 6 the rings are positioned on an upstream end 513' of the rear isolator 513 which has the smallest outside diameter of the rear isolator 513. Further, in exemplary embodiments of the present invention, each grouping of the rings, respectively, are separated by a distance D4 (centerline to centerline) which is in the range of 2 to 50% of the overall length L4 of the rear isolator 513. In other exemplary embodiments, the distance D4 is in the range of 2 to 16% of the overall length L4. Such dimensions provide for optimal positioning of the sealing rings to ensure that proper seal is maintained during operation and component failure. That is, each grouping of rings 514/515 and 516/517 are separated (the distance between the respective rings of each pairing) by the same distance D4. However, in other exemplary embodiments, the distance of separation need not be the same. In exemplary embodiments of the present invention, the sealant rings 514, 515, 516 and 517 are the same. However, in other exemplary embodiments, the rings 514, 515, 516 and 517 can have different dimensions/characteristics such that they provide different pressure resistance.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope of the present application.

What is claimed is:

1. A plasma arc torch, comprising:
   a cathode adaptor body having at least two first sealant channels formed on an outer surface of a first end of the cathode adaptor body to respectively accept at least two first sealant rings, the at least two first sealant channels are spaced apart from each other by a first distance that is in a range of 2 percent to 90 percent of an overall length of the cathode adaptor body;
   a cathode body coupled to a second end of the cathode adaptor body, the cathode body having at least two second sealant channels formed on an outer surface of the cathode body to respectively accept at least two second sealant rings, the at least two second sealant channels are spaced apart from each other by a second distance that is in a range of 2 percent to 50 percent of an overall length of the cathode body;
   a pilot arc connector having at least two third sealant channels formed on an outer surface of the pilot arc connector to respectively accept at least two third sealant rings, the at least two third sealant channels are spaced apart from each other by a third distance that is in a range of 2 percent to 90 percent of an overall length of the pilot arc connector; and
   a rear isolator that isolates the cathode body from an anode body, the rear isolator having
   at least two fourth sealant channels formed on an outer surface of the rear isolator to respectively accept at least two fourth sealant rings, the at least two fourth sealant rings engaging with an inner surface of the anode body and the at least two fourth sealant channels are spaced apart from each other by a fourth distance that is in a range of 2 percent to 50 percent of an overall length of the rear isolator, and
   at least two fifth sealant channels formed on the outer surface of the rear isolator to respectively accept at least two fifth sealant rings, the at least two fifth sealant rings engaging with an inner surface of a ring isolator and the at least two fifth sealant channels are spaced apart from each other by a fifth distance that is in a range of 2 percent to 50 percent of the overall length of the rear isolator.

2. The plasma arc torch of claim 1, wherein the first distance is in a range of 2 percent to 25 percent of the overall length of the cathode adaptor body.

3. The plasma arc torch of claim 1, wherein the at least two first sealant rings are O-rings.

4. The plasma arc torch of claim 1, wherein the at least two first sealant rings have at least one of same dimensions and same compositions.

5. The plasma arc torch of claim 1, wherein the at least two first sealant rings have at least one of different dimensions and different compositions.

6. The plasma arc torch of claim 1, wherein the first end of the cathode adaptor body is opposite the second end of the cathode adaptor body in a direction of flow of a cooling fluid.

7. The plasma arc torch of claim 1, wherein the second distance is in a range of 2 percent to 12 percent of the overall length of the cathode adaptor body.

8. The plasma arc torch of claim 1, wherein the at least two second sealant rings are O-rings.

9. The plasma arc torch of claim 1, wherein the at least two second sealant rings have at least one of same dimensions and same compositions.

10. The plasma arc torch of claim 1, wherein the at least two second sealant rings have at least one of different dimensions and different compositions.

11. The plasma arc torch of claim 1, wherein a distance between a center of the second distance a center of the overall length of the cathode body is no more than 10 percent of the overall length of cathode body.

12. The plasma arc torch of claim 1, wherein the third distance is in a range of 2 percent to 50 percent of the overall length of the pilot arc connector.

13. The plasma arc torch of claim 1, wherein the at least two third sealant rings are O-rings.

14. The plasma arc torch of claim 1, wherein the at least two third sealant rings have at least one of same dimensions and same compositions.

15. The plasma arc torch of claim 1, wherein the at least two third sealant rings have at least one of different dimensions and different compositions.

16. The plasma arc torch of claim 1, wherein a distance between a center of the third distance a center of the overall length of the pilot arc connector is no more than 20 percent of the overall length of pilot arc connector.

17. The plasma arc torch of claim 1, wherein the fourth distance is in a range of 2 percent to 16 percent of the overall length of the rear isolator.

18. The plasma arc torch of claim 1, wherein the fifth distance is in a range of 2 percent to 16 percent of the overall length of the rear isolator.

19. The plasma arc torch of claim 1, wherein the fourth distance equals the fifth distance.

20. The plasma arc torch of claim 1, wherein the fourth distance does not equal the fifth distance.

21. The plasma arc torch of claim 1, wherein the at least two fourth sealant rings are O-rings and the at least two fifth sealant rings are O-rings.

* * * * *